US012617496B2

(12) United States Patent
Busson

(10) Patent No.: US 12,617,496 B2
(45) Date of Patent: May 5, 2026

(54) MECHANICAL CONNECTION DEVICE, DESIGNED FOR THE REMOVABLE MECHANICAL CONNECTION OF THE FREE ENDS OF TWO OFFSHORE LINES

(71) Applicant: NOV-BLM, Carquefou (FR)

(72) Inventor: Philippe Busson, Saint Herblain (FR)

(73) Assignee: NOV-BLM, Carquefou (FR)

( * ) Notice: Subject to any disclaimer, the term of this patent is extended or adjusted under 35 U.S.C. 154(b) by 642 days.

(21) Appl. No.: 18/095,904

(22) Filed: Jan. 11, 2023

(65) Prior Publication Data

US 2023/0219657 A1     Jul. 13, 2023

(30) Foreign Application Priority Data

Jan. 12, 2022    (FR) ...................................... 2200227

(51) Int. Cl.
  *B63B 21/20*        (2006.01)
  *F16G 11/02*        (2006.01)
(52) U.S. Cl.
  CPC ............ *B63B 21/20* (2013.01); *F16G 11/025* (2013.01); *B63B 2021/203* (2013.01)
(58) Field of Classification Search
  CPC ... B63B 21/20; B63B 2021/203; B63B 21/50; B63B 21/10; B63B 21/04; B63B 21/08; B63B 2021/004; F16G 11/025
  See application file for complete search history.

(56) References Cited

U.S. PATENT DOCUMENTS

| | | | |
|---|---|---|---|
| 5,366,313 A | 11/1994 | Labarre | |
| 10,974,792 B2 * | 4/2021 | Taylor | ..................... B63B 21/04 |
| 2009/0241304 A1 | 10/2009 | Halstead et al. | |
| 2016/0052604 A1 | 2/2016 | Taylor et al. | |

FOREIGN PATENT DOCUMENTS

| | | | | |
|---|---|---|---|---|
| EP | 3 475 157 | | 10/2020 | |
| GB | 2592795 A | * | 9/2021 | ............. B63B 21/50 |
| NO | 329901 B1 | * | 1/2011 | ............. E02D 27/42 |

OTHER PUBLICATIONS

French Search Report dated Sep. 21, 2022, for FR 2200227, 2 pp.

* cited by examiner

*Primary Examiner* — Anthony D Wiest
(74) *Attorney, Agent, or Firm* — NIXON & VANDERHYE

(57) ABSTRACT

Disclosed is a mechanical connection device designed for the detachable mechanical connection of the free ends of two offshore lines, advantageously a mooring line and a messenger line. The mechanical connection device includes two modules that are attached to a free end of the offshore lines. The mechanical connection device includes a locking unit that includes an operating member, to operate the locking unit from a locked configuration to an unlocked configuration. The operating member is movable between two positions with a translational degree of freedom parallel to the longitudinal axis of the modules in the assembled state, preferably in a downstream to upstream direction.

19 Claims, 10 Drawing Sheets

[Fig. 1]
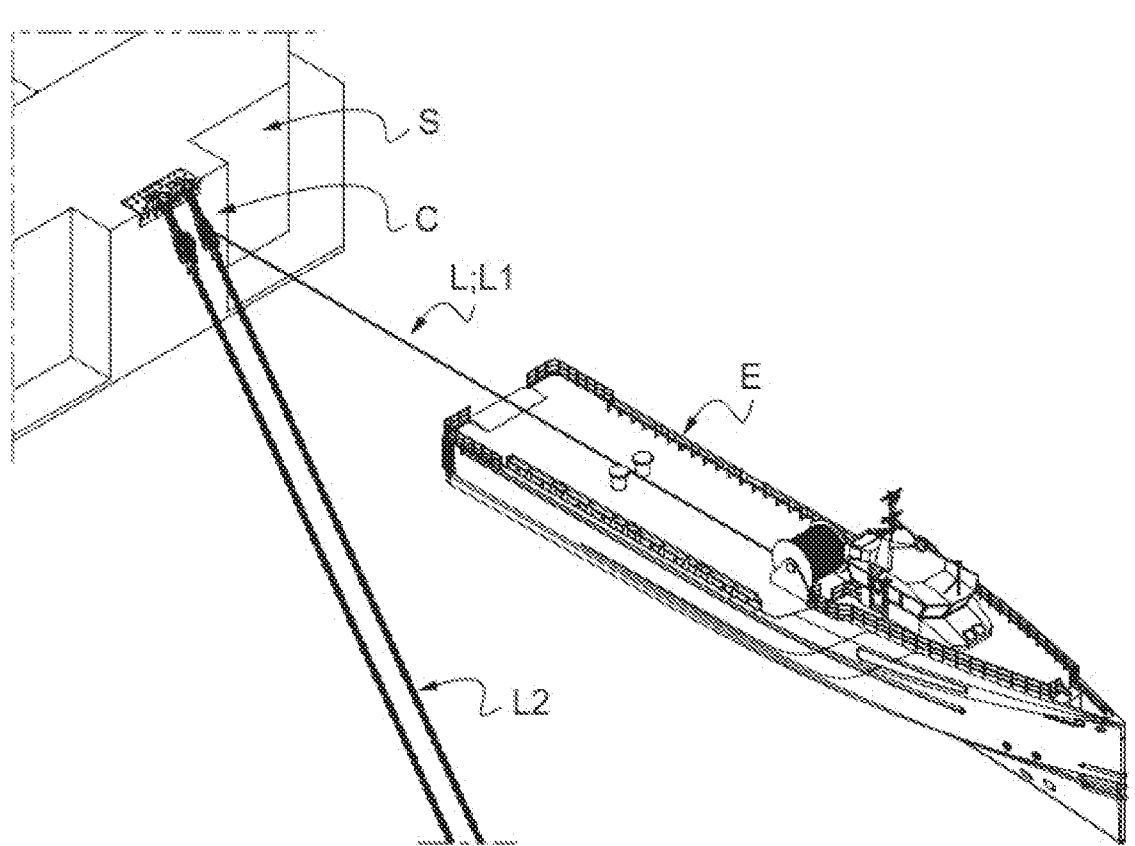

[Fig. 2]
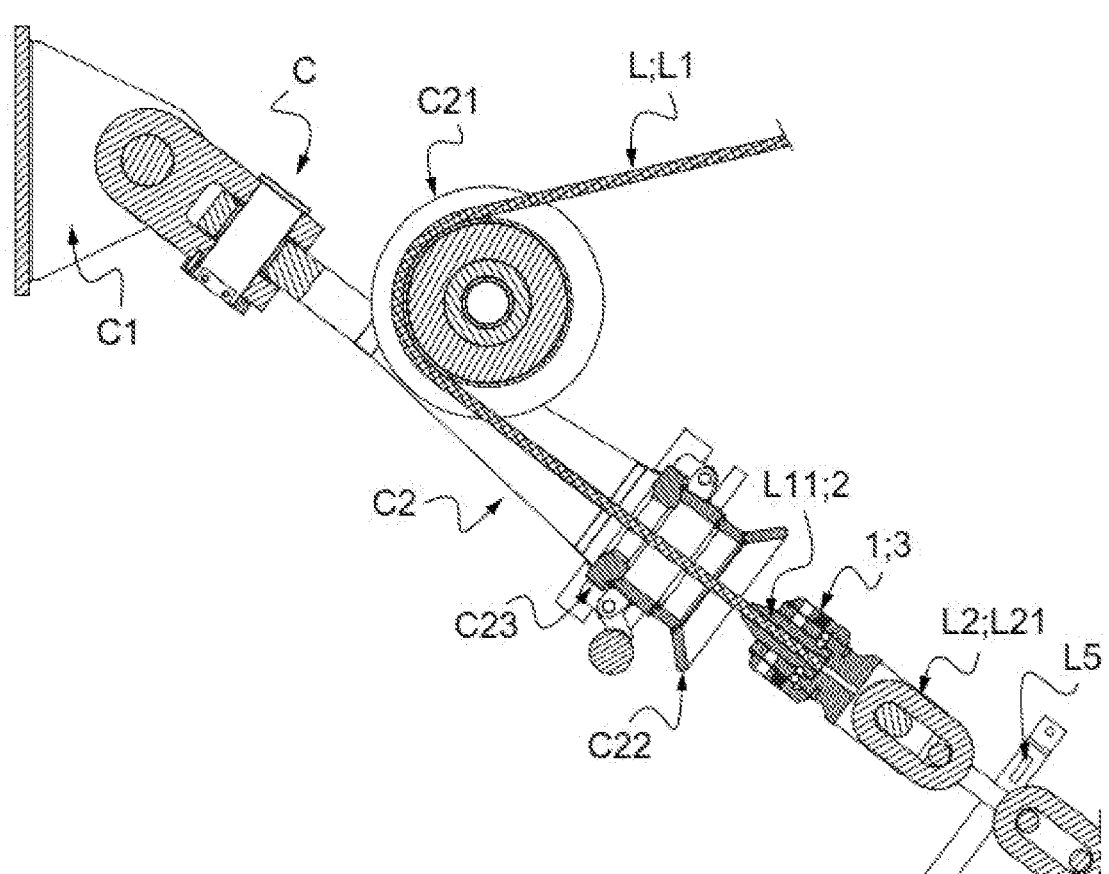

[Fig. 3]
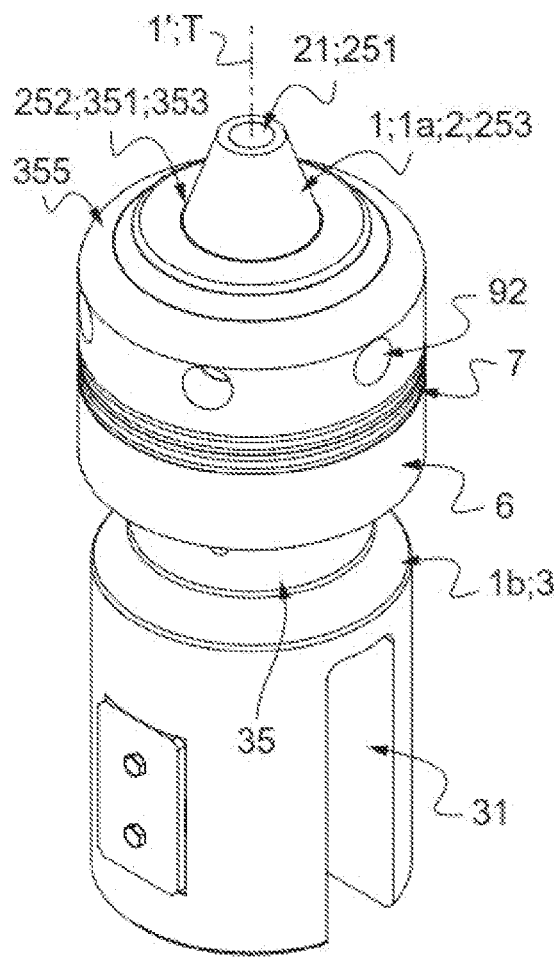

[Fig. 4]
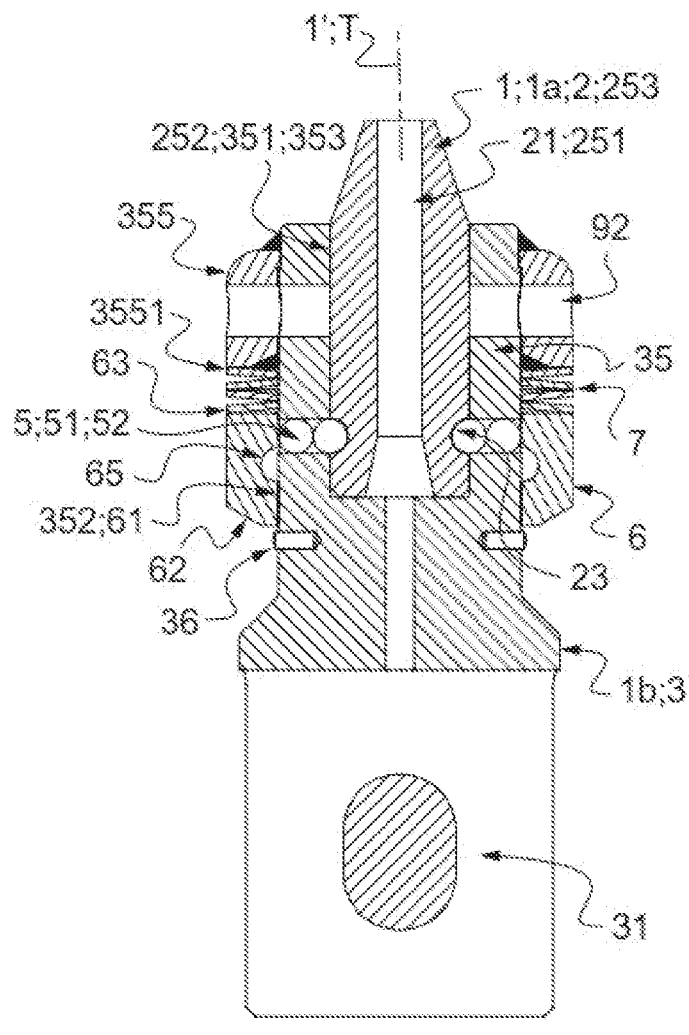

[Fig. 5]
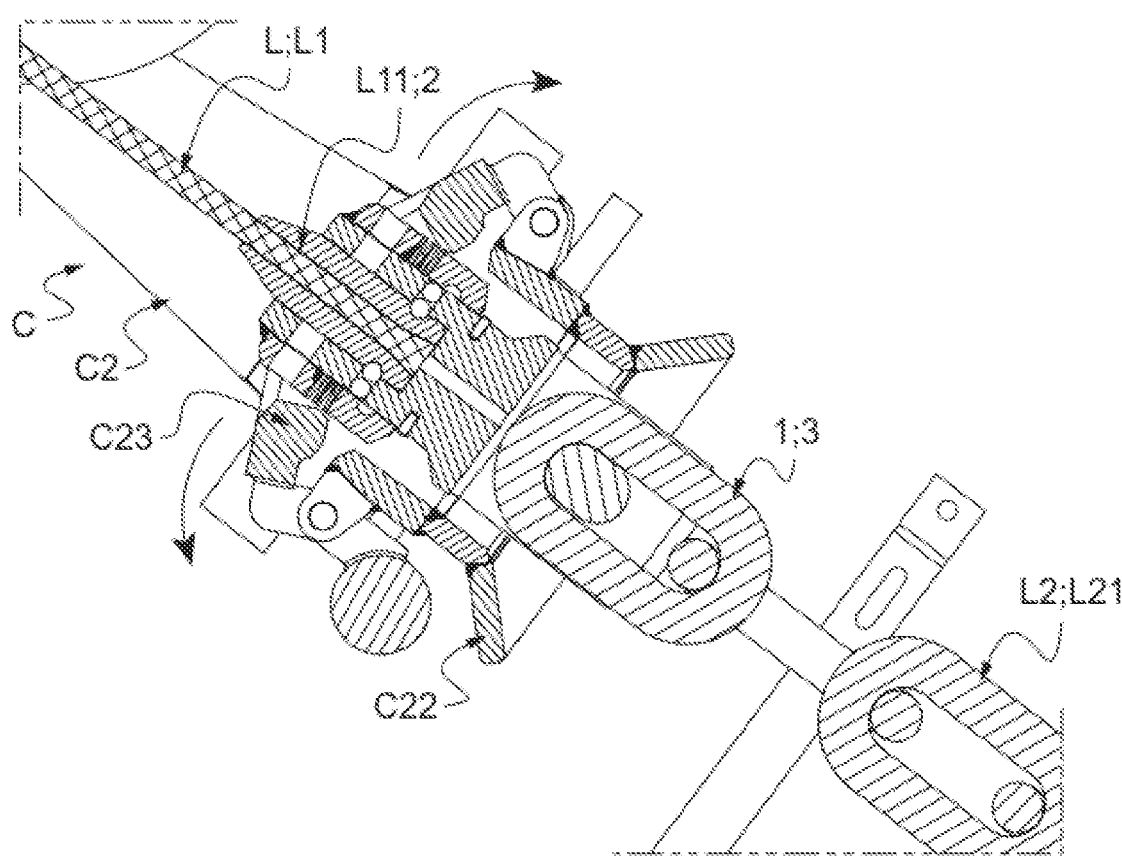

[Fig. 6]
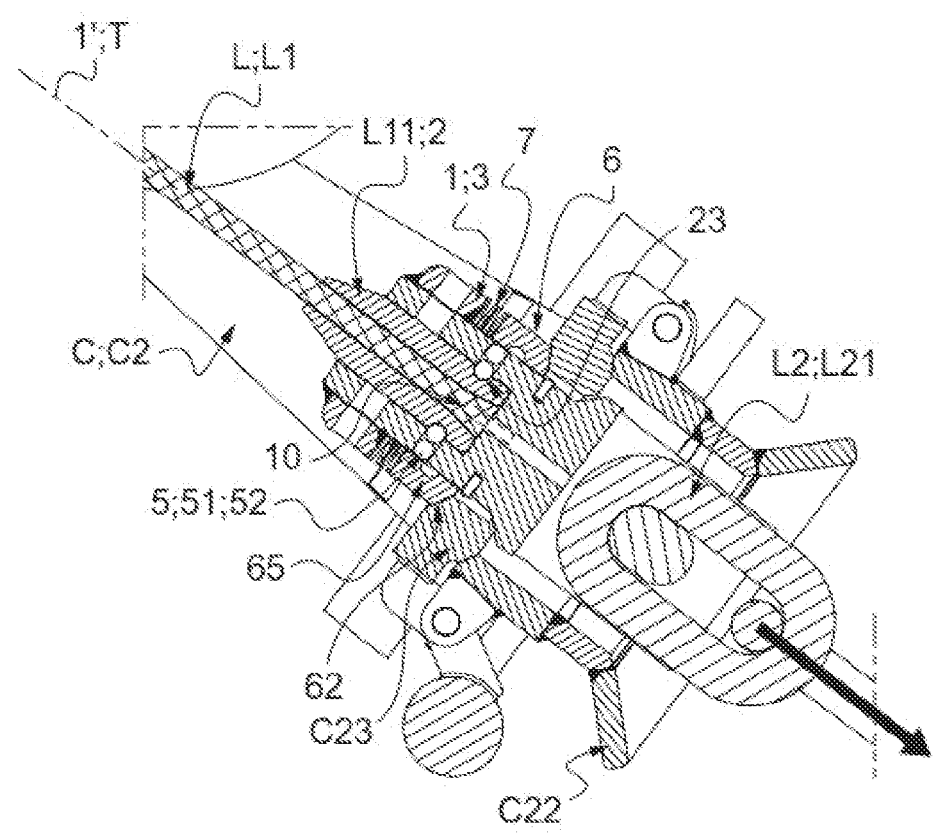

[Fig. 7]
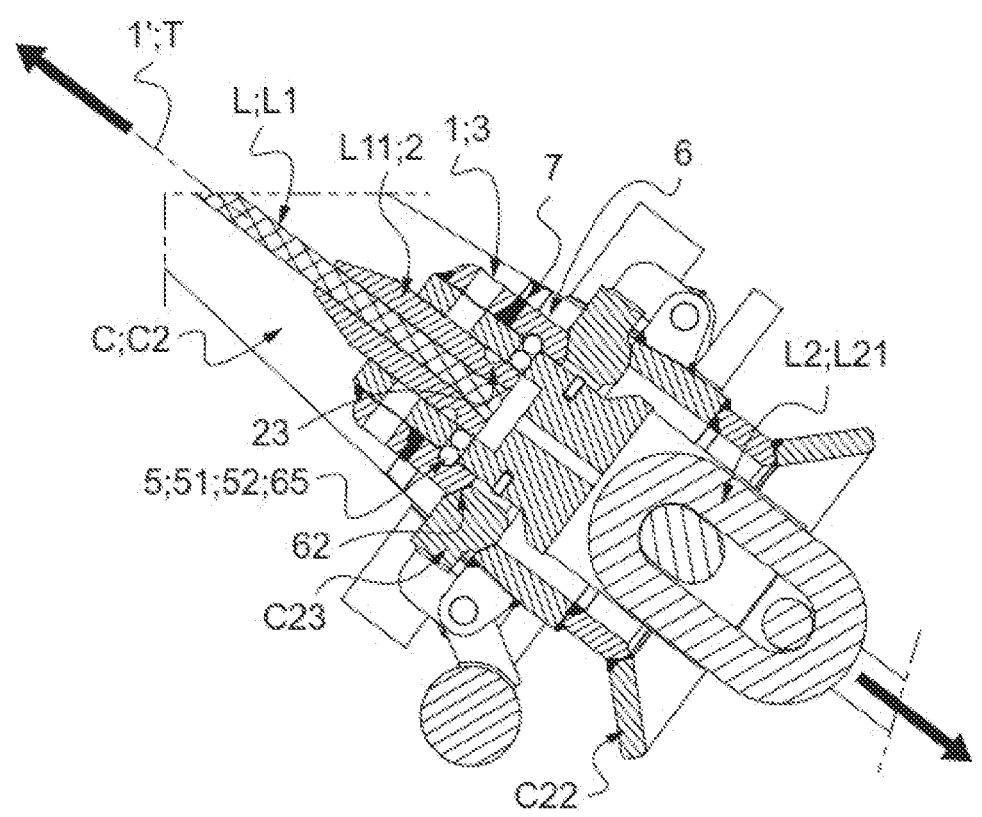

[Fig. 8]
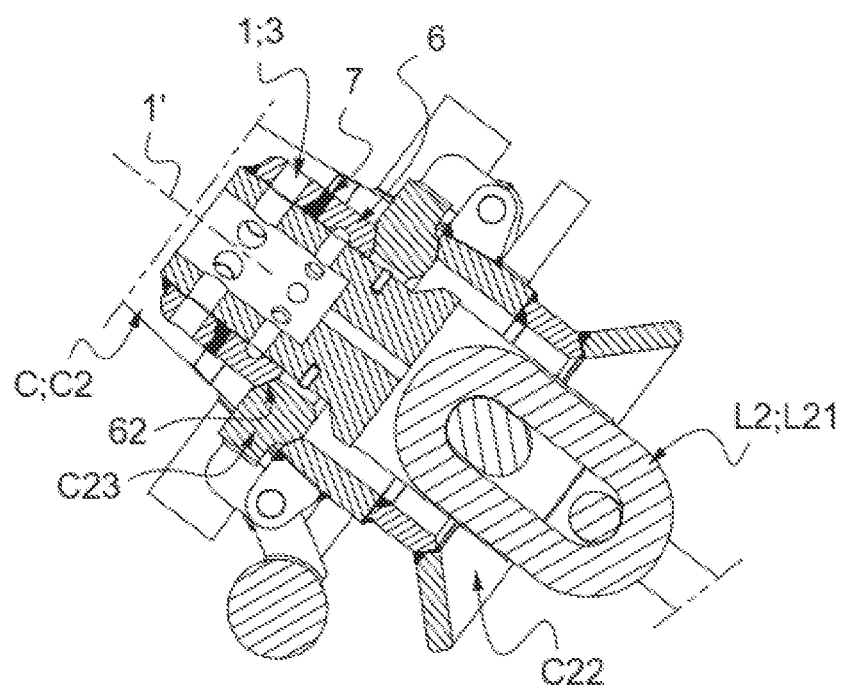

[Fig. 9]
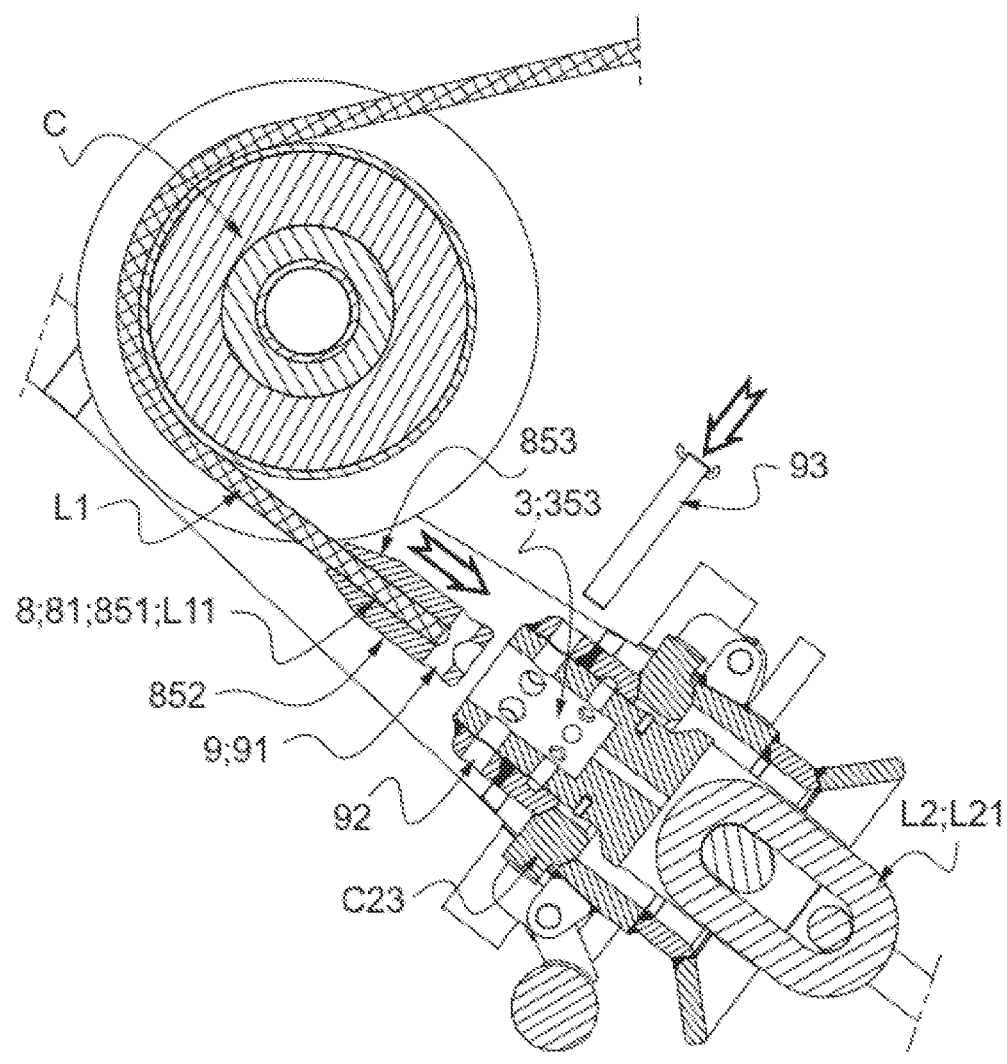

[Fig. 10]
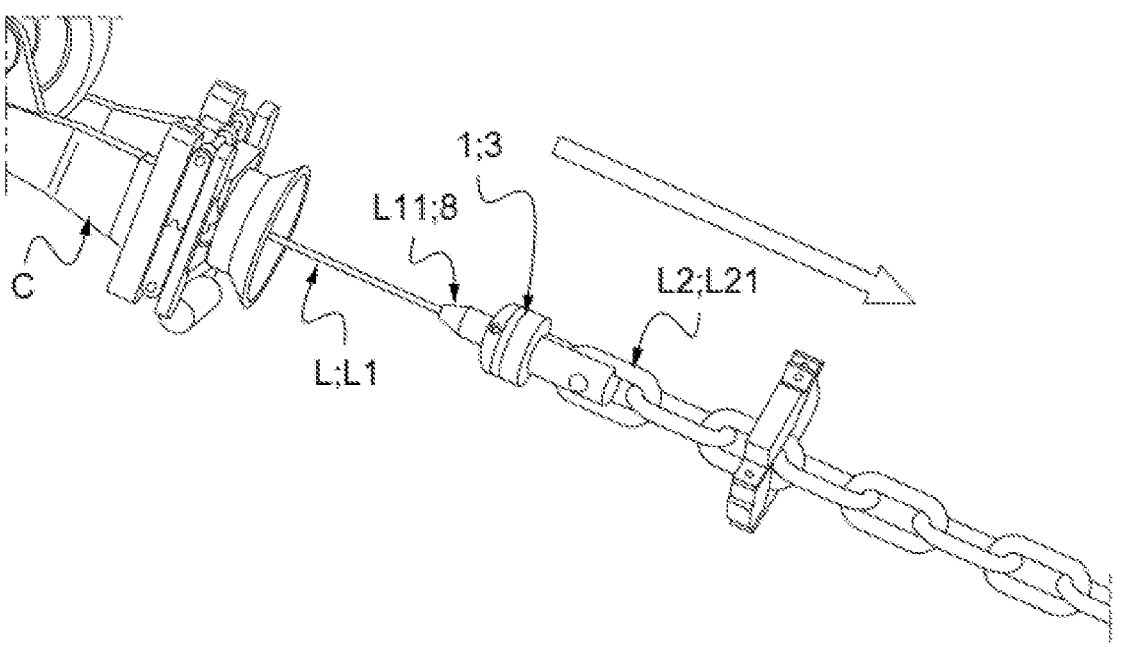

MECHANICAL CONNECTION DEVICE, DESIGNED FOR THE REMOVABLE MECHANICAL CONNECTION OF THE FREE ENDS OF TWO OFFSHORE LINES

CROSS-REFERENCE TO RELATED APPLICATION

This application claims priority to FR 2200227 filed Jan. 12, 2022, the entire contents of which are hereby incorporated by reference.

TECHNICAL FIELD OF THE INVENTION

The present invention relates to the technical field of offshore industry. In particular, it relates to mechanical connection devices that are designed for detachable mechanical connection of the free ends of two offshore lines implemented for example at the time of anchoring floating structures.

BACKGROUND OF THE INVENTION

In the offshore domain, floating structures are conventionally anchored to the ground by means of anchor lines, also called "mooring lines", generally in the form of chains.

For that purpose, the lower end of a mooring line is conventionally provided with means for its attachment to the ground, through a massif embedded in the seabed.

The upper end of this same mooring line is advantageously connected to the floating structure through a device commonly called a "fairlead", which is generally implanted below the waterline.

The tension applied to the mooring line is locked by translation blocking means fitted on the fairlead, for example as a clamp formed of two jaws articulated about axes of rotation parallel to each other.

Conventionally, to perform this tensioning, the free end of a line called the "messenger line" is temporarily connected to the free end of the mooring line.

This messenger line can then be used to apply a traction to the mooring line, until obtaining the desired tension on this latter.

The connection between the mooring line and the messenger line must hence be temporary, conventionally implemented by a dedicated mechanical connection device taking into account in particular the forces undergone during the traction.

Such a mechanical connection device usually comprises two modules that are respectively secured to the free end of an offshore line and that are designed for relative movement between assembled and disassembled states.

But, in practice, the current mechanical connection devices are not fully satisfying.

Indeed, once the mooring line tensioned, the disconnection of the modules is often particularly complex due to the conditions of intervention (sometimes below the waterline).

Moreover, this disconnection generally requires a "human" intervention on the mechanical connection device, for example by a diver or via an underwater vehicle (ROV).

This disconnection problem is all the more important, especially in terms of cost and time, that the number of disconnections increases (for example, in the case of floating wind farms, with tens of modules to be disconnected).

There thus exists a need for a mechanical connection device whose modules could be disconnected without external intervention, including below the waterline.

SUMMARY OF THE INVENTION

In order to remedy the above-mentioned drawback of the state of the art, the present invention proposes a mechanical connection device, designed for detachable mechanical connection of the free ends of two offshore lines, advantageously a mooring line and a messenger line.

The mechanical connection device comprises two modules:
- a first module, upstream, provided with attachment means for attachment to a free end of a first offshore line, advantageously the messenger line, and
- a second module, downstream, provided with attachment means for attachment to a free end of a second offshore line, advantageously the mooring line.

The modules are designed for relative movement between two states:
- an assembled state, in which the modules are assembled and define a longitudinal axis, with said first module defining an upstream end and said second module defining a downstream end, and
- a disassembled state, in which the modules are separated from each other.

The mechanical connection device comprises locking means that have two configurations:
- a locked configuration, in which the modules are locked in said assembled state, and
- an unlocked configuration, in which the modules are operable between said assembled state and said disassembled state.

The locking means include an operating member, to operate the locking means from the locked configuration to the unlocked configuration.

And, according to the invention, the operating member is movable between two positions with a translational degree of freedom parallel to the longitudinal axis of the modules in the assembled state, preferably in a downstream to upstream direction, i.e.
- an initial position, preferably on the side of said downstream end, in which the locking means are in the locked configuration, and
- a final position, preferably on the side of said upstream end, in which the locking means are in the unlocked configuration.

Such a technical solution makes it possible to envisage automatic disconnection of the modules, without requiring "human" intervention on the mechanical connection device.

As mentioned hereinabove, the gain is significant (in particular in terms of cost, time and security) when the number of disconnections increases (for example, in the case of floating wind farms, with tens of modules to be uncoupled).

According to a preferred embodiment, the second module comprises a tubular body including two cylindrical surfaces:
- an inner cylindrical surface defining a housing adapted to receive the first module in the assembled state, and
- an outer cylindrical surface along which the operating member is guided with said translational degree of freedom.

Other non-limiting and advantageous features of this preferred embodiment, taken individually or according to all the technically possible combinations, are the following:
- the operating member consists of a ring having an inner cylindrical surface, conforming the outer cylindrical surface of the tubular body for translation guiding, and a downstream annular surface, advantageously frusto-conical, advantageously forming a bearing surface, in particular for moving from the initial position to the final position and for bearing on translation blocking means of a fairlead;

the locking means comprise, on the one hand, on the second module, at least one radial duct, running through the tubular body, a locking member, for example a ball, added free in translation into said at least one radial duct to define the locked/unlocked configurations, and said operating member including a recess intended to receive the locking member in the unlocked configuration, and on the other hand, on the first module, at least one recess intended to receive the locking member in the locked configuration;

the first module has a tubular body defining two surfaces: an inner cylindrical surface intended to receive the free end of the first offshore line, and an outer cylindrical surface conforming, with a clearance, the housing of the second module.

Other non-limiting and advantageous features of the product according to the invention, taken individually or according to all the technically possible combinations, are the following:

the operating member cooperates with deformable holding means, for example Belleville washers or an elastomer block, intended to tend to hold said operating member in the initial position and to be deformed to generate the movement from the initial position to the final position; the tubular body advantageously has a flange that is connected to the outer cylindrical surface, remote from the attachment means, said deformable holding means being advantageously implanted between said flange and the operating member;

the mechanical connection device comprises a third module including attachment means for attachment to a free end of the first offshore line; the third module and the second module include additional detachable securing means that are adapted for their temporary mechanical connection after disassembly of the first module and the second module; the additional detachable securing means consisting for example of radial through-holes that are locked by an elongated mechanical member, for example a pin or a spindle;

in the assembled state, the modules are also linked by a degradable link member that is intended to be broken upon passage from an assembled state to a disassembled state.

The present invention also relates to the couple of offshore lines, whose free ends are assembled together by a mechanical connection device according to the invention.

The offshore lines L are advantageously chosen among a chain or a cable.

The present invention also relates to the floating structure comprising a fairlead provided with means for blocking a mooring line in translation in an upstream to downstream direction.

The fairlead is associated with:

a couple of offshore lines according to the invention, or the mooring line including the second module of the mechanical connection device according to the invention, in the disassembled state, and the translation blocking means, in active position, being capable of blocking in translation the operating member in the upstream to downstream direction and, as the case may be, generating a translational operation of the operating member from the initial position to the final position.

Still according to the invention, the method for anchoring a floating structure by means of couples of offshore lines comprises:

a step of pulling on the first offshore line of a couple of offshore lines through a fairlead, in a downstream to upstream direction, until the mechanical connection device goes upstream from the translation blocking means, a step of releasing said couple of offshore lines, in which the translation blocking means block the operating member and cause said operating member to move from the initial position to the final position, leading to an unlocked configuration of the locking means, a new step of pulling on the first offshore line for the recovery thereof, the second module being held within the fairlead by said translation blocking means.

Of course, the different features, alternatives and embodiments of the invention can be associated with each other according to various combinations, insofar as they are not mutually incompatible or exclusive.

DETAILED DESCRIPTION OF THE INVENTION

Moreover, various other features of the invention will be apparent from the appended description made with reference to the drawings that illustrate non-limiting embodiments of the invention, and wherein:

FIG. 1 is an overall view of a floating structure according to the invention, including fairleads each associated with a second offshore line forming a mooring line, wherein one of these mooring lines is being pulled by means of a messenger line;

FIG. 2 is an isolated and enlarged view of a fairlead fitted on the floating structure, passed through by a couple of offshore lines, the free ends of which are assembled by a mechanical connection device according to the invention;

FIG. 3 is an isolated and enlarged view of a mechanical connection device according to the invention;

FIG. 4 is an isolated and enlarged view, along a longitudinal cross-sectional plane, of a mechanical connection device according to the invention;

FIG. 5 is a partial and enlarged view of the fairlead according to FIG. 2, wherein the mechanical connection device passes through the translation blocking means in the downstream to upstream direction;

FIG. 6 is a partial and enlarged view of the fairlead according to FIG. 2, wherein the mechanical connection device bears against the translation blocking means;

FIG. 7 is a partial and enlarged view of the fairlead according to FIG. 2, wherein the translation blocking means, in active position, cause a movement of an operating member that operates the modules in a disassembled state;

FIG. 8 is a partial and enlarged view of the fairlead according to FIG. 2, wherein the translation blocking means, in active position, block a second module of the mechanical connection device in translation, in the upstream to downstream direction;

FIG. 9 is a partial and enlarged view of the fairlead according to FIG. 2, wherein the second module of the mechanical connection device is being in temporary mechanical connection with a third module;

FIG. 10 is a partial and enlarged view of the fairlead according to FIG. 2, wherein the third module and the second module are connected in such a way as to allow a handling of the second offshore line in an upstream to downstream direction.

It is to be noted that, in these figures, the structural and/or functional elements common to the different alternatives can have the same references numbers.

The mechanical connection device 1 according to the invention, illustrated in FIG. 2 and following, is designed for the detachable mechanical connection of two offshore lines L.

Generally, the offshore lines L are advantageously chosen among a chain or a cable.

The offshore lines L, denoted by the references L1, L2, respectively, consist for example of:

a first offshore line L1, upstream, known as the messenger line L1, and a second offshore line L2, downstream, known as the mooring line L2.

The terms "upstream" and "downstream" advantageously correspond to a convention considering the anchoring point, with:

the downstream side corresponding to this anchoring point, generally fixed with respect to the seabed, and the upstream side corresponding to an opposite point, generally a towing point.

In practice, preferably, at the opposite of the mechanical connection device 1, the first offshore line L1 is connected to a towing device E, for example a laying vessel, an anchor handling tug supply (AHTS), or a Multicat vessel.

Still opposite the mechanical connection device 1, the second offshore line L2 is advantageously anchored to the seabed, for example through a massif embedded in the seabed.

Such offshore lines L advantageously cooperate with a floating structure S described hereinafter (FIG. 1), preferably through a fairlead C fitted on this floating structure S (FIG. 2).

According to the invention, as illustrated in FIG. 2 and following, the mechanical connection device 1 is designed for detachable mechanical connection of the free ends L11, L21 of the two offshore lines L.

For that purpose, the mechanical connection device 1 comprises two modules 2, 3 advantageously made of metal:

a first module 2 (also called "socket"), upstream, attached to the free end L11 of the first offshore line L1, advantageously the messenger line, and a second module 3 (also called "yoke"), downstream, attached to the free end L21 of the second offshore line L2, advantageously the mooring line.

Still generally, according to the invention, the modules 2, 3 are designed for relative movement between two states:

an assembled state (FIGS. 2 to 6), in which the modules 2, 3 are assembled, creating a continuity between the assembled offshore lines L, and a disassembled state (FIGS. 7 and 8), in which the modules 2, 3 are separated from each.

In the assembled state, the modules 2, 3 define a longitudinal axis 1'. Moreover, the first module 2 defines an upstream end 1a and the second module 3 defines a downstream end 1b.

The mechanical connection device 1 also comprises locking means 5 (between the two modules 2, 3), which have two configurations:

a locked configuration (FIGS. 2 to 6), in which the modules 2, 3 are locked in the above-mentioned assembled state, and an unlocked configuration (FIGS. 7 and 8), in which the modules 2, 3 are operable between the above-mentioned assembled and disassembled states.

The locking means 5 include an operating member 6 (also called here "drawer"), to operate the locking means 5 from the locked configuration to the unlocked configuration.

And, according to the invention, the operating member 6 is movable between two positions with a translational degree of freedom T parallel to the longitudinal axis 1' of the modules 2, 3 in the assembled state, preferably in a downstream to the upstream direction, i.e.:

an initial position (FIGS. 2 to 6), preferably on the side of the downstream end 1' of the mechanical connection device 1, in which the locking means 5 are in the locked configuration, and a final position (FIGS. 7 and 8), preferably on the side of the upstream end 1a of the mechanical connection device 1, in which the locking means 5 are in the unlocked configuration.

As developed hereinafter, such an operating member 6 has for interest to be automatically operable, advantageously within the fairlead C passed through by the offshore lines L.

First Module

The first module 2, upstream, is provided with attachment means 21 for attachment to the free end L11 of the first offshore L1.

Herein, these attachment means 21 consist for example of a cylindrical duct 21 intended to receive the free end L11 of the first offshore line L1 in the form of a cable.

According to an embodiment illustrated in FIG. 4, the first module 2 comprises a tubular body 2 (denoted by the same reference number for the sake of simplicity) having two cylindrical surfaces 251, 252:

an inner cylindrical surface 251 defining the cylindrical duct 21 intended to receive the free end L11 of the first offshore line L1, and an outer cylindrical surface 252 here intended to come into the second module 3 and to conform, with a clearance, a housing of this second module 3.

The cylindrical surfaces 251, 252 are advantageously coaxial with respect to the longitudinal axis 1'.

The outer cylindrical surface 252 advantageously ends up by an upstream frustoconical portion 253 (converging in the downstream to upstream direction), in such a way as to facilitate the travel thereof within the fairlead C in the downstream to upstream direction.

This upstream frustoconical portion 253 is advantageously in protrusion with respect to the second module 3, in the assembled state.

Second Module

The second module 3, downstream, includes attachment means 31 for attachment to the free end L21 of the second offshore line L2.

Herein, these attachment means 31 consist for example of a yoke intended to receive the free end L21 of the second offshore line L2 in the form of a chain link.

According to an embodiment illustrated in FIG. 4, the second module 3 also comprises a tubular body 35 including two cylindrical surfaces 351, 352:

an inner cylindrical surface 351 defining a housing 353 (advantageously, a blind housing) adapted to receive the first module 2 in the assembled state, and an outer cylindrical surface 352 along which the operating member 6 is guided with the above-mentioned translational degree of freedom T.

The cylindrical surfaces 351, 352 are advantageously coaxial with respect to the longitudinal axis 1'.

Preferably, the inner cylindrical surface 351 defines a housing 353 whose cross-section corresponds, with a clearance, to the outer cylindrical surface 252 of the first module 2.

The tubular body 35 of the second module 3 also advantageously has a flange 355, that is connected to the outer cylindrical surface 352, remote from the attachment means 31 (on the upstream side of the outer cylindrical surface 352).

This flange 355 advantageously has a downstream annular surface 3551 that is intended to form here a translational end stop for the operating member 6 in the final position (on the upstream side).

The outer cylindrical surface 352 also advantageously comprises at least one downstream translational end stop 36, here added after the mounting of the operating member 6 on the tubular body 35.

The operating member 6 advantageously consists of a ring 6 that is mobile in translation along the outer cylindrical surface 352 of the tubular body 35 in such a way as to define its initial and final positions.

The ring 6 advantageously comprises:
  an inner cylindrical surface 61, conforming the outer cylindrical surface 352 of the tubular body 35 for translation guiding,
  a downstream annular surface 62, and
  an upstream annular surface 63, advantageously coming opposite the downstream annular surface 3551 of the flange 355.

The downstream annular surface 62 is advantageously frustoconical (flared in a downstream to upstream direction) and advantageously forms a bearing surface, in particular for moving from the initial position to the final position, which is advantageously obtained by bearing on translation blocking means C23 of a fairlead C.

Generally, the second module 3 advantageously comprises radial through-holes 92, for the later coupling of this second module 3 to a third module 8.

These radial through-holes 92 are advantageously formed in the tubular body 35 and, preferably, in the flange 355.

Locking Means

The locking means 5, provided for locking the modules 2, 3 in the assembled state, are advantageously distributed over the two modules 2, 3.

On the one hand, the second module 3 advantageously comprises:
  at least one radial duct 51, running through the tubular body 35, between its inner 351/outer 352 cylindrical surfaces,
  a locking member 52, for example at least one ball (here a pair of balls), added free in translation into said at least one radial duct 51 to define the locked/unlocked configurations, and
  the operating member 6 including an "outer" recess 65 that is intended, in the final position, to receive the locking member 52 to define the unlocked configuration.

The "outer" recess 65 is advantageously arranged within the inner cylindrical surface 61 of the operating member 6.

This recess 65 here has a general spherical cap shape.

On the other hand, the first module 2 advantageously comprises at least one "inner" recess 23 intended to receive the locking member 52 the locked configuration.

The "inner" recess 23 is advantageously arranged within the outer cylindrical surface 252 of this first module 2.

This recess 23 here has a general spherical cap shape.

Generally, the locking member 52 advantageously has two radial positions within its radial duct 51:
  an internal radial position (FIG. 4), in which it is partially held within the recess 23 of the first module 2 by the operating member 6 in its initial position (partially protruding on the side of the inner cylindrical surface 351 of the second module 3), and
  an external radial position (FIG. 7), in which it is moved outward by the first module 2 and partially housed into the recess 65 of the operating member 6 in its final position (partially protruding on the side of the outer cylindrical surface 352 of the second module 3).

Herein, in the initial position, the recess 65 of the operating member 6 is offset with respect to the radial duct 51 thereof. And the inner cylindrical surface 61 ensures the holding of the locking member 52 in its internal radial position.

In the final position, the recess 65 of the operating member 6 is opposite the radial duct 51 thereof, to receive the locking member 52 in its external radial position.

Deformable Holding Means

The operating member 6 advantageously cooperates with deformable holding means 7 that are intended to tend to hold this operating member 6 in its initial position.

These deformable holding means 7 are moreover intended to be deformed (in compression) to allow the movement of the operating member 6 from its initial position to its final position.

In other words, the deformable holding means 7 have two states:
  an initial state, non compressed, in which the operating means 6 is held in its initial position, and
  a final state, compressed, caused by the movement of the operating member 6 from its initial position to its final position.

As developed hereinafter, these deformable holding means 7 are advantageously structured to be deformed (in compression) by the traction force exerted by the second offshore line L2 assembled with the second module 3.

Herein, the deformable holding means 7 consist for example of a superposition of Belleville washers. These deformable holding means 7 may also consist of an elastomer block.

Generally, the deformable holding means 7 are advantageously carried by the second module 3, implanted between the flange 355 and the operating member 6.

These deformable holding means 7 are here sandwiched between the downstream annular surface 3551 of the flange 355 and the upstream annular surface 63 of the ring 6.

Still generally, the deformable holding means 7 are advantageously in the general form of a ring or a crown that surround the outer cylindrical surface 352 of the tubular body 35 and that is sandwiched between the flange 355 and the ring 6.

Third Module of the Mechanical Connection Device

The mechanical connection device 1 also advantageously comprises a third module 8 that is intended to be attached to a first offshore line L1 and that is intended to be temporarily connected to the second module 3 of the second offshore line L2, free, after separation from the first module 2 (FIGS. 9 and 10).

For that purpose, generally, the third module 8 includes means 81 for attachment to the free end L11 of the first offshore line L1.

The third module 8 and the second module 3 comprise additional detachable securing means 9 that are adapted for their temporary mechanical connection after disassembly of the first module 2 and the second module 3.

The additional detachable securing means 9 consist for example of radial through-holes 91, 92 that are arranged in the third module 8 and the second module 3, respectively.

The radial through-holes 91, 92, aligned with each other, are locked by an elongated mechanical member 93, for example a pin or a spindle.

Herein, the third module 8 is similar to the first module 2.

The attachment means 81 of the third module 8 consist for example of a cylindrical duct 81 intended to receive the free end L11 of the first offshore line L1 in the form of a cable.

According to an embodiment illustrated, the third module 8 comprises a tubular body 8 (denoted by the same reference number for the sake of simplicity) having two cylindrical surfaces 851, 852:

an inner cylindrical surface 851 defining the cylindrical duct 81 intended to receive the free end L11 of the first offshore line L1, and an outer cylindrical surface 852 here intended to come into the second module 3 and to conform the housing 353 of the second module 3.

The outer cylindrical surface 852 advantageously ends up by an upstream frustoconical portion 853, in such a way as to facilitate the travel thereof within the fairlead C in the downstream to upstream direction.

The tubular body 8 also comprises, on the side of its downstream end, at least one radial through-hole 91 belonging to the additional detachable securing means 9.

Degradable Link Member

In the assembled state, the first module 2 and the second module 3 are advantageously also linked by a degradable link member 10 (FIG. 6) that is intended to be broken upon passage from an assembled state to a disassembled state.

This degradable link member 10 is in particular useful to temporary retain the first module 2 upon passage from the assembled state to the disassembled state, and hence avoid a possible upstream propulsion phenomenon on the first module 2.

For that purpose, the degradable link member 10 consists for example of a link part that is secured to the first module 2 and the second module 3. This link part 10 is intended to break due to the traction force exerted in opposite directions on the offshore lines L and to the relative spacing movement between the modules 2, 3.

Floating Structure

A floating structure S according to the invention comprises a fairlead C provided with means C23 for blocking a mooring line L2 in translation in an upstream to downstream direction.

Such a floating structure S consists for example, without being restrictive, of a wind turbine float, a floating production, storage and offloading (or FPSO) unit, a floating storage and offloading (or FSO) unit, a semi-submersible, a floating fish farm, a solar panel float, a buoy, a wave float.

An example of fairlead C is illustrated in particular in FIG. 2.

A fairlead C possibly allows offsetting, below the waterline, the point from which the mooring line L2 moves away from the floating structure S. This fairlead C also ensures the guiding of a change of direction of the messenger line L1.

The fairlead C advantageously includes two structures:

an upstream structure C1, for securing this fairlead C to the floating structure S, and a downstream structure C2, free to rotate about two perpendicular axes of rotation (via, for example, a couple of articulations), which includes:

deviation means C21, for guiding a change of direction of the first offshore line L1, for example a pulley, and guiding means C22 (for example in the form of a duct) for guiding in translation the offshore lines L1, L2, that are equipped with translation blocking means C23, for the blocking in translation of the second offshore line L2 in an upstream to downstream direction.

The translation blocking means C23 consist for example of a ratchet-type blocking device that is designed to allow a movement of the second offshore line L2 in a downstream to upstream direction while preventing a movement of this same second offshore line L2 in an upstream to downstream direction.

Herein, and as developed hereinafter, the translation blocking means C2 are here designed to allow a movement of the mechanical connection device 1 in an downstream to upstream direction while preventing a movement of this same mechanical connection device 1 in an upstream to downstream direction.

The translation blocking means C23 here consist of a clamp formed of two jaws articulated about axes of rotation parallel to each other.

In practice, the fairlead C is intended to be associated with:

a couple of offshore lines L according to the invention (FIG. 2), connected by the mechanical connection device 1, for example at the time of tensioning the anchorage, or the second offshore line L2 including the second module 3 of the mechanical connection device 1, in the disassembled state, for example when the anchorage is finalized (FIG. 8).

The translation blocking means C23, in active position, are advantageously structured to block the operating member 6 in translation in the upstream to downstream direction and to participate to the translational operation of this operating member 6 from the initial position to the final position thereof (from the downstream to the upstream side).

Still generally, the second module 3 of the mechanical connection device 1 is advantageously blocked in translation, in the upstream to downstream direction, by its operating member 6 (and in particular the downstream annular surface 62 thereof) bearing on the translation blocking means C23 (while advantageously allowing a translation of the tubular body 35).

In other words, the translation blocking means C23 advantageously define a passage whose diameter is:

lower than the diameter of the operating member 6, and higher than the diameter of the outer cylindrical surface 352.

In addition to releasing the first module 2, this technical solution has for interest to allow the second offshore line L2 to be inserted and blocked inside the fairlead C, without requiring a particular orientation of this second offshore line L2 (in particular, when it consists of a chain).

Method for the Anchoring of a Floating Structure S

The present invention also relates to the method for the anchoring of a floating structure S by means of the couple of offshore lines L that are connected by the mechanical connection device 1 according to the invention.

The method comprises for that purpose:

a preparation step consisting in connecting the offshore lines L, a step of pulling on the first offshore line L1 of the couple of offshore lines L through the fairlead C, in a downstream to upstream direction, until the mechanical connection device 1 goes upstream from the translation blocking means C23 (FIGS. 1 and 6), a step of releasing the couple of offshore lines L, in which the translation blocking means C23 block the operating member 6 (in the upstream to downstream direction) and cause the operating member 6 to move from the initial position to the final position (from downstream to upstream side), leading to an unlocked configuration of the locking means 5 (FIGS. 6 and 7), a new step of pulling on the first offshore line L1 for the recovery thereof, the second module 3 being held within the fairlead C by the translation blocking means C23 (FIGS. 7 and 8).

In practice, the preparation step is carried out for example by means of a laying vessel that recovers, on the one hand, the mooring line L2 (coming from the anchor already on the seabed) and, on the other hand, the messenger line L1 sent from the floating structure S; the connection of the two offshore lines L is then advantageously made on the bridge of the laying vessel.

Moreover, to control the passage of the mechanical connection device 1 upstream from the translation blocking means C23, the second offshore line L2 is advantageously fitted with a target washer L5 that is intended to bear against the guiding means C22.

During the releasing step, the translation blocking means C23 block the operating means 6 in translation while allowing a relative movement of the tubular body 35 (from the downstream to the upstream side) linked to the traction force exerted by the mass of the second offshore line L2.

This relative movement hence allows the operating member 6 to move from the initial position to the final position.

The deformable holding means 7 are then advantageously structured so as to be deformed by the traction force exerted by the second offshore line L2 on the tubular body 35 (advantageously under the effect of their own weight).

Generally, herein, when the operating member 6 reaches its final position, a recess 65 of the operating member 6 comes opposite a radial duct 51.

This recess 65 here allows a radial movement of the locking member 52 within the radial duct 51, from an internal position conforming the recess 23 of the first module 2 (FIG. 2) to an external position releasing this recess 23 of the first module 2 (FIG. 7).

The first module 2 and its associated first offshore line L1 are hence released with respect to the second module 3.

In operation, the mooring load is therefore advantageously transmitted from the second offshore line L2 to the fairlead C, via the second module 3 of the connection device 1.

Moreover, the connection device 1 according to the invention also allows a new handling of the second offshore line L2, for example and without being restrictive, to replace a mooring line, to "disanchor" the floating structure S and its equipment (for example, a turbine) and to bring them back to the quay for maintenance that cannot be carried out at sea.

The method comprises for that purpose:

a step of connecting an first offshore line L1 to the second offshore line L2, by temporarily connecting the third module 8 to the second module 3 waiting inside the fairlead C (FIG. 9), a step of pulling on the first offshore line L1 of the couple of offshore lines L through the fairlead C, in a downstream to upstream direction, for opening the translation blocking means C23, then a step of releasing the couple of offshore lines L, in which the translation blocking means C23 are locked in the open position and the connection device 1 (formed by the third module 8/second module 3 couple) is extracted from the fairlead C, towards the downstream side (FIG. 10).

Of course, various other modifications can be made to the invention within the framework of the appended claims.

The invention claimed is:

1. A mechanical connection device for a detachable mechanical connection of the free ends of two offshore lines, said mechanical connection device comprising:

two modules including a first module, upstream, including a first attachment system configured to attach to a free end of a first offshore line, and a second module, downstream, including a second attachment system configured to attach to a free end of a second offshore line, said modules being configured for relative movement between two states including an assembled state, in which the modules are assembled and define a longitudinal axis, said first module defining an upstream end and said second module defining a downstream end, and a disassembled state, in which the modules are separated from each other; and a locking system that has two configurations including a locked configuration, in which the modules are locked in said assembled state, and an unlocked configuration, in which the modules are operable between said assembled state and said disassembled state, said locking system including an operating member, to operate the locking system from the locked configuration to the unlocked configuration, the operating member being movable between two positions according to a translational degree of freedom parallel to the longitudinal axis of the modules in the assembled state including an initial position, in which the locking system is in the locked configuration, and a final position, in which the locking system is in the unlocked configuration, wherein, in the assembled state, the modules are linked by a degradable link member that is configured to be broken upon passage from the assembled state to the disassembled state.

2. The mechanical connection device according to claim 1, wherein the second module comprises a tubular body including two cylindrical surfaces including an inner cylindrical surface defining a housing configured to receive the first module in the assembled state, and an outer cylindrical surface along which the operating member is guided with said translational degree of freedom.

3. The mechanical connection device according to claim 2, wherein the operating member consists of a ring having:

an inner cylindrical surface, conforming the outer cylindrical surface of the tubular body for translation guiding, and a downstream annular surface.

4. The mechanical connection device of claim 3, wherein the downstream annular surface is configured to move from the initial position to the final position and to bear on a translation blocking system of a fairlead.

5. The mechanical connection device according to claim 3, wherein the locking system comprises:

on the second module:

at least one radial duct, running through the tubular body, and a locking member, added free in translation into said at least one radial duct to define the locked configuration and the unlocked configuration, said operating member including a recess to receive the locking member in the unlocked configuration, and on the first module, at least one recess to receive the locking member in the locked configuration.

6. The mechanical connection device according to claim 2, wherein the locking system comprises:

on the second module:

at least one radial duct, running through the tubular body, and a locking member, added free in translation into said at least one radial duct to define the locked configuration and the unlocked configuration, said operating member including a recess to receive the locking member in the unlocked configuration, and on the first module, at least one recess to receive the locking member in the locked configuration.

7. The mechanical connection device of claim 6, wherein the locking member is a ball.

8. The mechanical connection device according to claim 2, wherein the first module comprises a tubular body defining two surfaces including an inner cylindrical surface intended to receive the free end of the first offshore line, and an outer cylindrical surface conforming, with a clearance, the housing of the second module.

9. The mechanical connection device according to claim 2, wherein the operating member cooperates with a deformable holder configured to hold said operating member in the initial position and to be deformed to generate movement from the initial position to the final position.

10. The mechanical connection device according to claim 9, wherein the tubular body has a flange that is connected to the outer cylindrical surface, remote from the attachment system, said deformable holder being implanted between said flange and the operating member.

11. The mechanical connection device according to claim 1, wherein the mechanical connection device comprises a third module including a third attachment configured to attach to a free end of the first offshore line, and wherein the third module and the second module comprise an additional detachable securing system that are configured for a temporary mechanical connection for the third module and the second module after disassembly of the first module and the second module.

12. A pair of offshore lines, having free ends assembled by the mechanical connection device according to claim 1.

13. A floating structure comprising:

a fairlead provided with a translation blocking system configured to block a mooring line in translation in an upstream-to-downstream direction, said fairlead being associated with the pair of offshore lines according to claim 12, the translation blocking system, in an active position, is configured to block the operating member in translation in the upstream-to-downstream direction and generate a translational operation of the operating member from the initial position to the final position.

14. A method for anchoring the floating structure according to claim 13 by the pair of offshore lines, said method comprising:

pulling on the first offshore line of the pair of offshore lines through a fairlead, in a downstream-to-upstream direction, until the mechanical connection device goes upstream from the translation blocking system;

releasing said pair of offshore lines, in which the translation blocking system blocks the operating member and causes said operating member to move from the initial position to the final position, leading to an unlocked configuration of the locking system; and pulling on the first offshore line for the recovery thereof, the second module being held within the fairlead by said translation blocking system.

15. The couple of offshore lines, according to claim 12, wherein the offshore lines are chosen from a chain and a cable.

16. The couple of offshore lines, according to claim 12, wherein the first module is attached to a free end of a messenger line, and wherein the second module is attached to a free end of the mooring line.

17. The mechanical connection device according to claim 1, wherein the operating member is movable between two positions according to the translational degree of freedom parallel to the longitudinal axis of the modules in the assembled state, from the downstream to the upstream, including the initial position, on the side of said downstream end, in which the locking system is in the locked configuration, and the final position, on the side of the upstream end, in which the locking system is in the unlocked configuration.

18. A mechanical connection device for a detachable mechanical connection of the free ends of two offshore lines, said mechanical connection device comprising:

two modules including a first module, upstream, including a first attachment system configured to attach to a free end of a first offshore line, and a second module, downstream, including a second attachment system configured to attach to a free end of a second offshore line, said modules being configured for relative movement between two states including an assembled state, in which the modules are assembled and define a longitudinal axis, said first module defining an upstream end and said second module defining a downstream end, and a disassembled state, in which the modules are separated from each other; and a locking system that has two configurations including a locked configuration, in which the modules are locked in said assembled state, and an unlocked configuration, in which the modules are operable between said assembled state and said disassembled state, said locking system including an operating member, to operate the locking system from the locked configuration to the unlocked configuration, the operating member being movable between two positions according to a translational degree of freedom parallel to the longitudinal axis of the modules in the assembled state including an initial position, in which the locking system is in the locked configuration, and a final position, in which the locking system is in the unlocked configuration, wherein the second module comprises a tubular body including two cylindrical surfaces including an inner cylindrical surface defining a housing configured to receive the first module in the assembled state, and an outer cylindrical surface along which the operating member is guided with said translational degree of freedom, wherein the operating member consists of a ring having:

an inner cylindrical surface, conforming the outer cylindrical surface of the tubular body for translation guiding, and a downstream annular surface, wherein the downstream annular surface is frustoconical and forms a bearing surface.

19. A floating structure comprising:

a fairlead provided with a blocking system configured to block a mooring line in translation in an upstream-to-downstream direction, said fairlead being associated with a mooring line including a second module of a mechanical connection device, in the disassembled state, wherein the mechanical connection device is configured for a detachable mechanical connection of the free ends of two offshore lines, said mechanical connection device comprising:

two modules including a first module, upstream, including a first attachment system configured to attach to a free end of a first offshore line, and a second module, downstream, including a second attachment system configured to attach to a free end of a second offshore line, said modules being configured for relative movement between two states including an assembled state, in which the modules are assembled and define a longitudinal axis, said first module defining an upstream end and said second module defining a downstream end, and a disassembled state, in which the modules are separated from each other, and a locking system that has two configurations including a locked configuration, in which the modules are locked in said assembled state, and an unlocked configuration, in which the modules are operable between said assembled state and said disassembled state, said locking system including an operating member, to operate the locking system from the locked configuration to the unlocked configuration, the operating member being movable between two positions according to a translational degree of freedom parallel to the longitudinal axis of the modules in the assembled state including an initial position, in which the locking system is in the locked configuration, and a final position, in which the locking system is in the unlocked configuration, and wherein the translation blocking system, in an active position, is configured to block the operating member in translation in the upstream-to-downstream direction and generate a translational operation of the operating member from the initial position to the final position.

* * * * *